(12) United States Patent
Wang et al.

(10) Patent No.: US 9,667,784 B2
(45) Date of Patent: May 30, 2017

(54) METHODS AND DEVICES FOR PROVIDING INFORMATION IN VOICE SERVICE (71) Applicant: Xiaomi Inc., Beijing (CN)

(72) Inventors: Wenlin Wang, Beijing (CN); Meng Xu, Beijing (CN); Tao Peng, Beijing (CN); Feng Hong, Beijing (CN)

(73) Assignee: Xiaomi Inc., Beijing (CN)

( * ) Notice: Subject to any disclaimer, the term of this patent is extended or adjusted under 35 U.S.C. 154(b) by 48 days.

(21) Appl. No.: 14/537,137

(22) Filed: Nov. 10, 2014

(65) Prior Publication Data

US 2015/0319617 A1 Nov. 5, 2015

Related U.S. Application Data (63) Continuation of application No. PCT/CN2014/084452, filed on Aug. 15, 2014.

(30) Foreign Application Priority Data

Apr. 30, 2014 (CN) .......................... 2014 1 0183189

(51) Int. Cl.
*H04M 3/16* (2006.01)
*H04M 3/487* (2006.01)
(Continued)

(52) U.S. Cl.
CPC .......... *H04M 3/487* (2013.01); *H04M 3/493* (2013.01); *H04W 12/08* (2013.01); *H04M 3/44* (2013.01);
(Continued)

(58) Field of Classification Search
CPC ........... H04M 1/274; H04M 1/274508; H04M 1/274533; H04M 1/274541; H04M 1/56;
(Continued)

(56) References Cited

U.S. PATENT DOCUMENTS

2006/0240809 A1* 10/2006 Yu ....................... H04L 63/0428
455/414.1
2012/0166810 A1* 6/2012 Tao ......................... G06F 21/32
713/186
(Continued)

FOREIGN PATENT DOCUMENTS

CN 1611056 A 4/2005
CN 1845498 A 10/2006
(Continued)

OTHER PUBLICATIONS

Extended European Search Report of European Patent Application No. 15157897.8, from the European Patent Office, dated Oct. 6, 2015 (6 pages).

(Continued)

*Primary Examiner* — Amancio Gonzalez
(74) *Attorney, Agent, or Firm* — Finnegan, Henderson, Farabow, Garrett & Dunner LLP (57) ABSTRACT

A method and a device for providing information for a voice service are provided. The method includes: detecting whether user personal information is required to acquire a service in an automatic voice service system; if the user personal information is required, acquiring the user personal information from a pre-stored user personal information database; and sending the acquired user personal information for the automatic voice service system to provide the service according to the user personal information.

19 Claims, 9 Drawing Sheets

(51) Int. Cl.
*H04W 12/08* (2009.01)
*H04M 3/493* (2006.01)
*H04M 3/44* (2006.01)

(52) U.S. Cl.
CPC *H04M 2203/253* (2013.01); *H04M 2203/256* (2013.01); *H04M 2203/557* (2013.01); *H04M 2203/6009* (2013.01)

(58) Field of Classification Search
CPC ...... H04M 1/57; H04M 1/642; H04M 17/207; H04M 2017/246
See application file for complete search history.

(56) References Cited

U.S. PATENT DOCUMENTS

| | | | |
|---|---|---|---|
| 2012/0314848 | A1 | 12/2012 | Grigsby et al. |
| 2013/0022191 | A1 | 1/2013 | Or-Bach et al. |
| 2013/0042204 | A1* | 2/2013 | Derks ............... H04M 1/72519 715/810 |
| 2013/0086193 | A1* | 4/2013 | Morisaki .............. H04L 51/06 709/206 |
| 2013/0136242 | A1* | 5/2013 | Ross ................. H04M 3/51 379/85 |
| 2014/0051422 | A1 | 2/2014 | Mittal et al. |
| 2014/0179283 | A1* | 6/2014 | Kwon ................. H04W 4/16 455/414.1 |
| 2015/0181422 | A1* | 6/2015 | Rombouts ............ H04L 63/08 380/270 |

FOREIGN PATENT DOCUMENTS

| | | |
|---|---|---|
| CN | 1946024 | 4/2007 |
| CN | 101005654 | 7/2007 |
| CN | 101394442 A | 3/2009 |
| CN | 101631118 A | 1/2010 |
| CN | 101895610 | 11/2010 |
| CN | 101969610 | 2/2011 |
| JP | 2002230460 | 8/2002 |
| JP | 2009528734 | 8/2009 |
| JP | 2012529859 | 11/2012 |
| JP | 2013246477 | 12/2013 |
| KR | 10-2000-0033525 | 6/2000 |
| KR | 10-2007-0043506 | 4/2007 |

OTHER PUBLICATIONS

Office Action of Korean Application No. 10-2014-7028784, from the Korean Intellectual Property Office, dated Sep. 21, 2015 (6 pages).
International Search Report of PCT/CN2014/084452, mailed from the State Intellectual Property Office of China on Jan. 28, 2015.

* cited by examiner

METHODS AND DEVICES FOR PROVIDING INFORMATION IN VOICE SERVICE

CROSS-REFERENCE TO RELATED APPLICATIONS

This application is a continuation of International Application No. PCT/CN2014/084452, filed Aug. 15, 2014, which is based upon and claims priority to Chinese Patent Application No. 201410183189.2, filed Apr. 30, 2014, the entire contents of all of which are incorporated herein by reference.

TECHNICAL FIELD

The present disclosure generally relates to the field of communication and, more particularly, to methods and devices for providing information in voice services.

BACKGROUND

In an automatic voice service, such as an automatic business agency service, after dialing a service number, a user may issue an instruction to an automatic voice service system using audio buttons, and then obtain a corresponding service from the automatic voice service system.

In a typical application, the user may dial the service number of the automatic voice service system using a terminal device to initiate the automatic voice service. After the service number is dialed, the automatic voice service system may play a voice prompt about a related menu. According to the voice prompt, the user may press corresponding buttons on the terminal device to send the instruction to the automatic voice service system, so as to enter a corresponding sub-menu. After entering the sub-menu, the user may press corresponding buttons to send the instruction to the automatic voice service system according to the voice prompt, so as to select a desired service, and consequently, the corresponding service may be provided by the automatic voice service system.

For example, the user may obtain various types of services provided by a bank by dialing a certain service number. After the number is dialed, the user may acquire services such as credit card application, credit card bill enquiry, and credit card loss reporting, according to the voice prompt played by the voice service system. In acquiring the services, the user is usually required to press corresponding buttons to input personal information such as a credit card number, a cell phone number reserved in the bank, and/or an ID card number.

Typically, a user is required to input the personal information such as various types of card numbers, the cell phone number reserved in the bank, and/or the ID card number every time when the user desires to obtain voice service. If the user inputs a wrong number, the user may be required by the automatic voice service system to input again. It may take a long time for the user to input the personal information, especially when the user uses the automatic voice service frequently on a daily basis. Further, more communication resources and energy resources of the terminal device and the server are consumed if the user inputs a wrong number and is required to input again.

SUMMARY

According to a first aspect of the present disclosure, there is provided a method for providing information for a voice service, comprising: detecting whether user personal information is required to acquire a service in an automatic voice service system; if the user personal information is required, acquiring the user personal information from a pre-stored user personal information database; and sending the acquired user personal information for the automatic voice service system to provide the service according to the user personal information.

According to a second aspect of the present disclosure, there is provided a device for providing information for a voice service, comprising: a processor; and a memory for storing instructions executable by the processor. The processor is configured to: detect whether user personal information is required to acquire a service in an automatic voice service system; acquire the user personal information from a pre-stored user personal information database, if the user personal information is required to acquire the service; and send the acquired user personal information for the automatic voice service system to provide the service according to the user personal information.

According to a third aspect of the present disclosure, there is provided a non-transitory computer-readable storage medium having stored therein instructions that, when executed by a processor of a terminal device, cause the terminal device to perform operations including: detecting whether user personal information is required to acquire a service in an automatic voice service system; if the user personal information is required, acquiring the user personal information from a pre-stored user personal information database; and sending the acquired user personal information for the automatic voice service system to provide the service according to the user personal information.

It is to be understood that both the foregoing general description and the following detailed description are exemplary and explanatory only and are not restrictive of the present disclosure.

BRIEF DESCRIPTION OF THE DRAWINGS

The accompanying drawings, which are hereby incorporated in and constitute a part of this specification, illustrate embodiments consistent with the present disclosure and serve to explain the principles of the present disclosure.

DETAILED DESCRIPTION

Reference will now be made in detail to exemplary embodiments, examples of which are illustrated in the accompanying drawings. When accompanying drawings are mentioned in the following description, the same numbers in different drawings represent the same or similar elements, unless otherwise represented. The following exemplary embodiments and description thereof intend to illustrate, rather than to limit, the present disclosure. Hereinafter, the present disclosure will be described with reference to the drawings.

Figure 1:
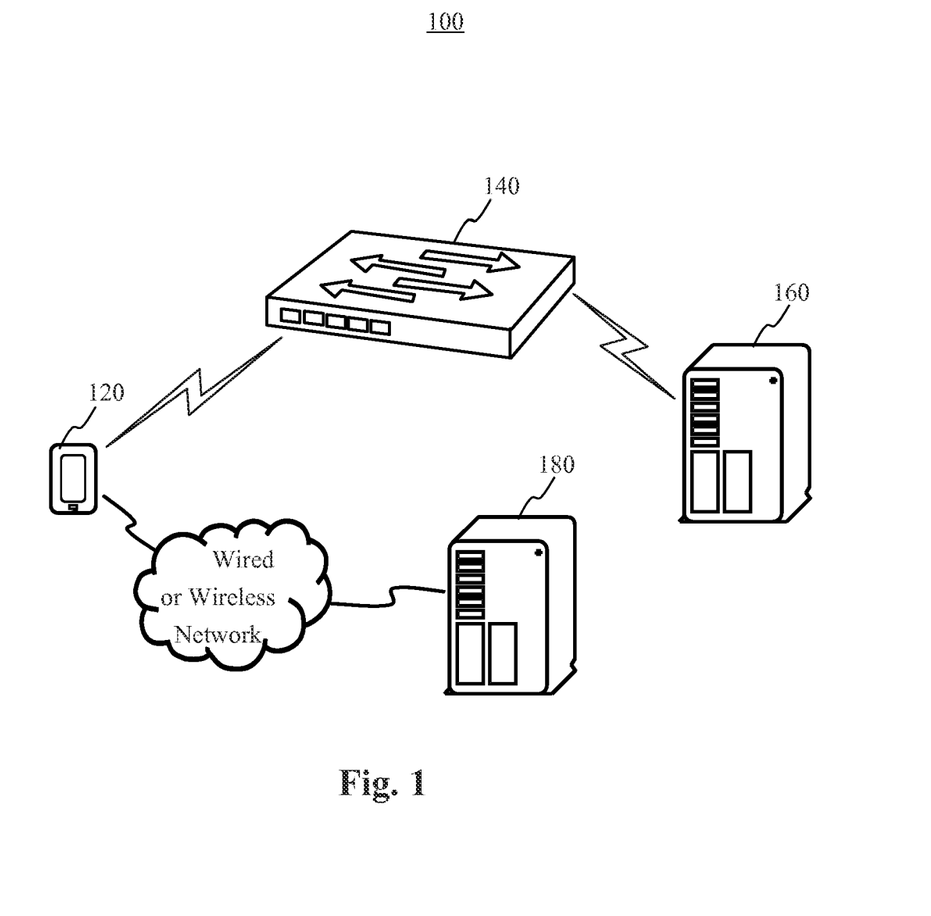
FIG. 1 is a schematic diagram of a system, according to an exemplary embodiment.

FIG. 1 is a schematic diagram of a system 100, according to an exemplary embodiment. Referring to FIG. 1, the system 100 includes a terminal device 120, a switch 140, and automatic voice service equipment 160.

The terminal device 120 includes a communication component configured to communicate with other equipment in a wired or wireless manner. The terminal device 120 may be a telephone set, a cell phone, a tablet PC, or the like.

The terminal device 120 may be connected to the switch 140 in a wired or wireless manner.

The switch 140 is configured to establish a communication connection between the terminal 120 and the automatic voice service equipment 160, and to enable information exchange between the terminal device 120 and the automatic voice service equipment 160.

The switch 140 may be connected to the automatic voice service equipment 160 in a wired or wireless manner.

The automatic voice service equipment 160 is installed with an automatic voice service system. The automatic voice service equipment 160 may be a terminal apparatus, a server, a server cluster composed of several servers, or a cloud computing service center.

In some embodiments, the system 100 may further include a server 180 which is connected to the terminal device 120 via a wired network or a wireless network.

The server 180 may be a server, a server cluster composed of several servers, or a cloud computing service center.

Figure 2:
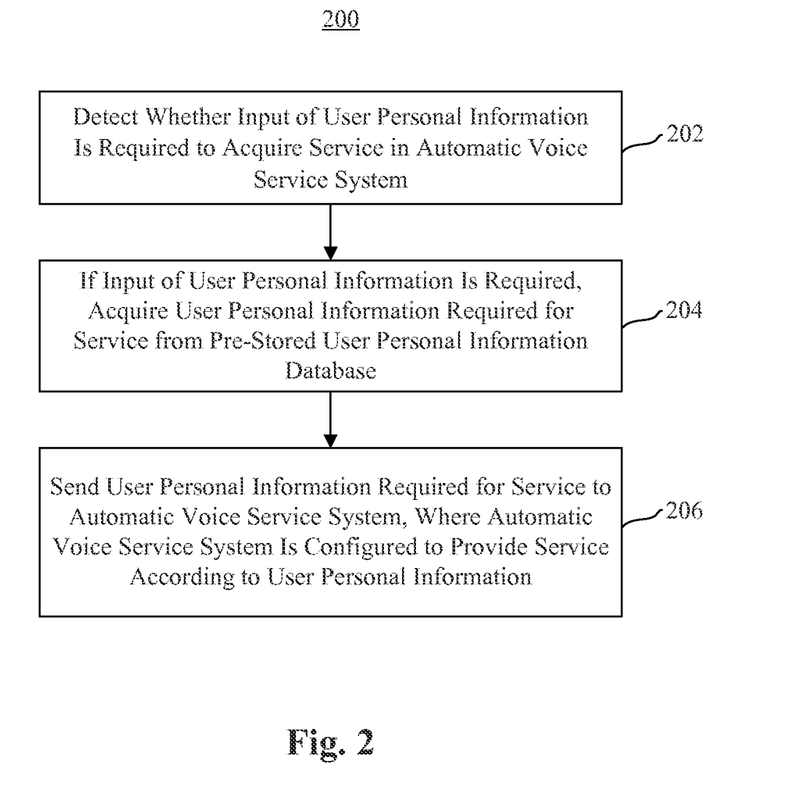
FIG. 2 is a flowchart showing a method for providing information for a voice service, according to an exemplary embodiment.

FIG. 2 is a flowchart showing a method 200 for providing information for a voice service, according to an exemplary embodiment. The method 200 may be performed by the terminal device 120 shown in FIG. 1. Referring to FIG. 2, the method 200 may include the following steps.

In step 202, the terminal device detects whether input of user personal information is required to acquire a service in an automatic voice service system.

In step 204, if input of the user personal information is required to acquire the service, the terminal device acquires the user personal information required for the service from a pre-stored user personal information database.

In step 206, the terminal device sends the user personal information required for the service to the automatic voice service system, where the automatic voice service system is configured to provide the service according to the user personal information.

By acquiring the user personal information required for the service from the pre-stored user personal information database and sending the user personal information to the automatic voice service system, the time and resources consumed by inputting the user personal information are reduced. In this embodiment, the user personal information required for the service is acquired from the pre-stored user personal information database. In doing so, the method 200 provides the benefits of saving the time taken for manually inputting the user personal information, avoiding the errors that might occur when the user personal information is manually inputted, increasing the efficiency for inputting the user personal information, and/or saving the time and resources consumed to acquire the automatic voice service.

Figure 3A:
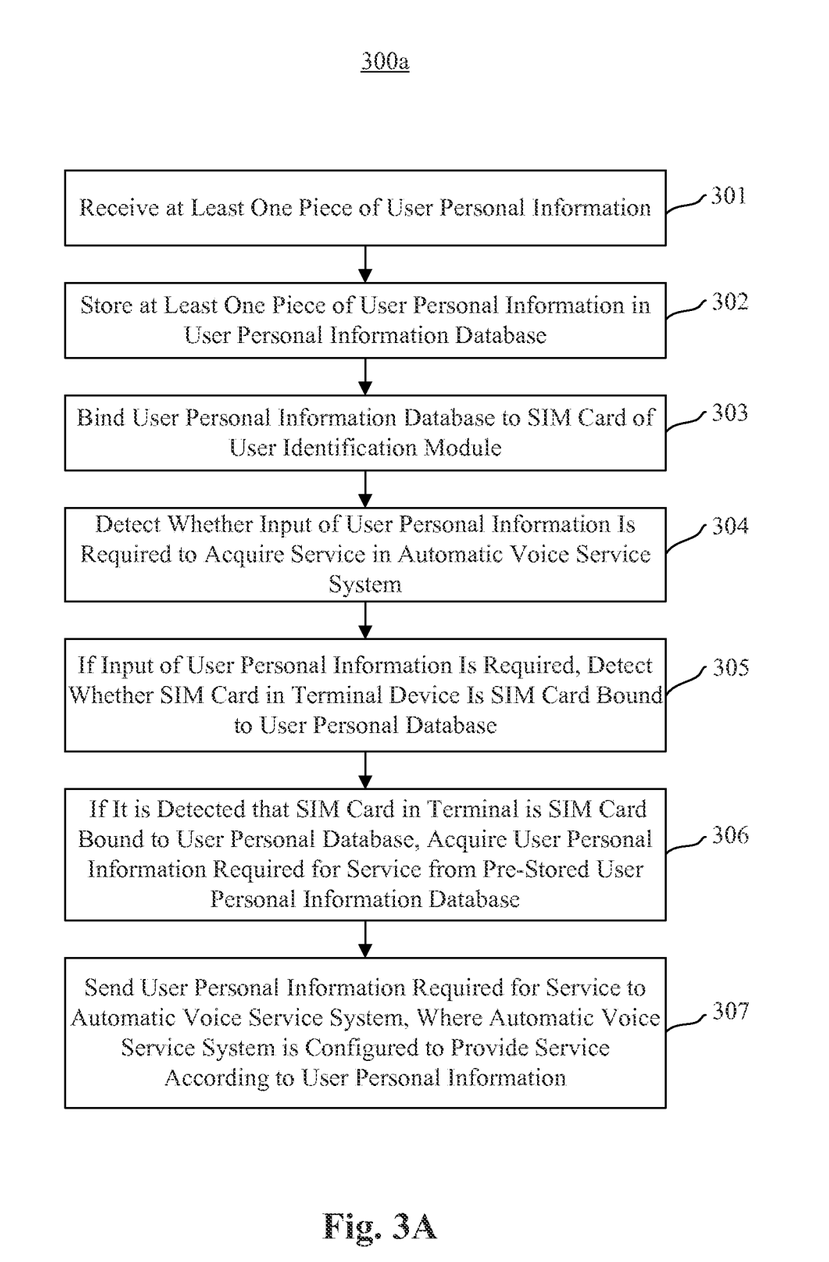
FIG. 3A is a flowchart showing a method for providing information for a voice service, according to another exemplary embodiment.

FIG. 3A is a flowchart showing a method 300a for providing information for a voice service, according to another exemplary embodiment. The method 300a may be performed by the terminal device 120 shown in FIG. 1. Referring to FIG. 3A, the method 300a may include the following steps.

In step 301, the terminal device receives at least one piece of user personal information.

In some embodiments, the terminal device receives at least one piece of the user personal information before initiating a voice service with the automatic voice service system. The user personal information refers to the information required to be inputted by a user when the user acquires an automatic voice service from an automatic voice service system. For example, the user personal information may include a certificate number, a cell phone number, various types of card numbers, and/or various types of account numbers.

The terminal device may receive the user personal information in various ways. For example, the terminal device may receive at least one piece of the user personal information provided by the user via a personal information input page. As another example, the terminal device may receive at least one piece of the user personal information from other apparatuses.

Figure 3B:
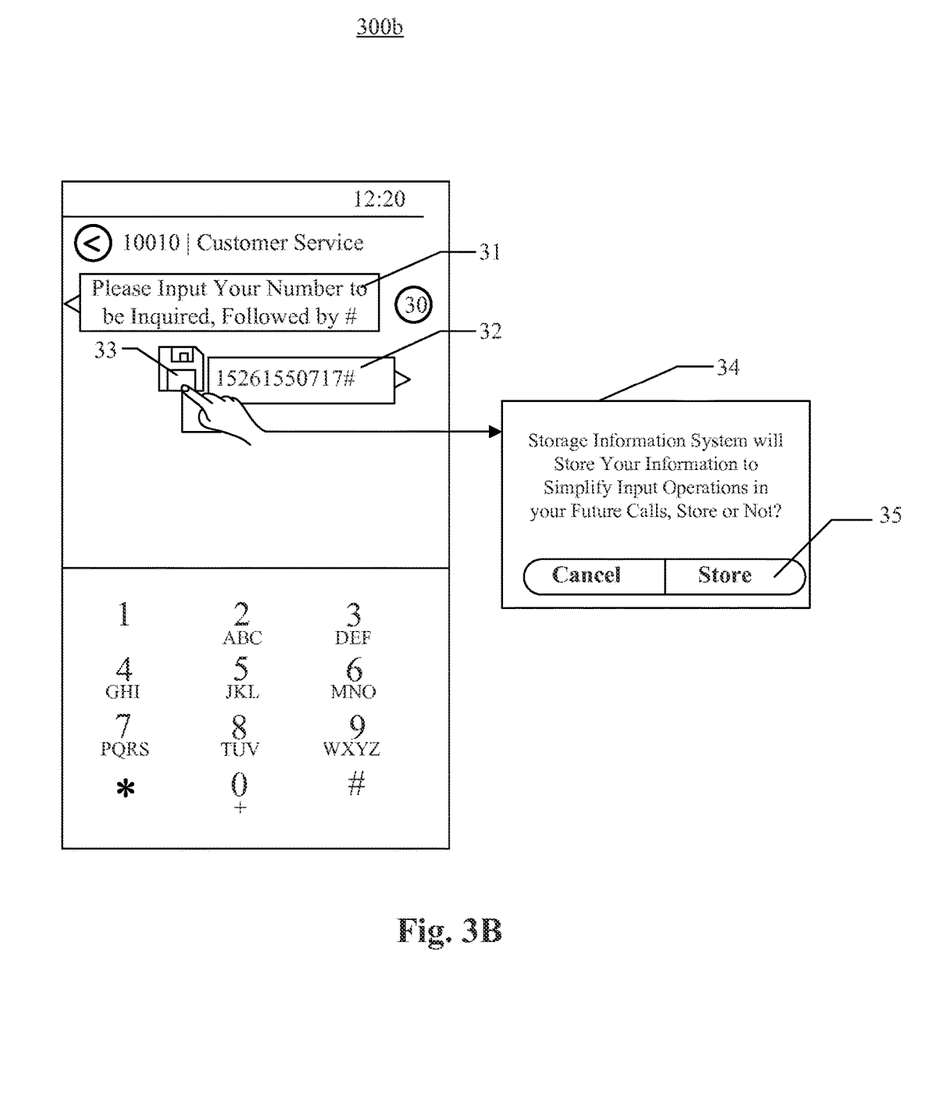
FIG. 3B is a schematic diagram of an interface for receiving and storing user personal information, according to an exemplary embodiment.

FIG. 3B shows a schematic diagram of an interface 300b for receiving and storing the user personal information, according to one embodiment of the present disclosure. In this example, the user calls a service number of a telecommunication operator to enquire his/her account. The terminal device displays a service menu 31 configured to prompt the user to input a number to be enquired, and the user inputs the number to be enquired, such as the user's own cell phone number "15261550717", in an input box 32, according to the prompt of the service menu 31. The terminal device receives the cell phone number inputted by the user in the input box 32, where the cell phone number is a piece of the user personal information.

In step 302, the terminal device stores at least one piece of the user personal information in a user personal information database.

The user personal information database may include n pieces of the user personal information, where n is greater or equal to 1.

Since the user personal information may include private information of the user such as certificate numbers, cell phone numbers, various types of card numbers, and various types of account numbers, in order to enhance the security of the user personal information, step 302 may include the following sub-steps.

Firstly, the terminal device may encrypt one or more pieces of the received user personal information.

For example, the user personal information may be encrypted by an encryption algorithm such as DES (Data Encryption Standard), AES (Advanced Encryption Standard) or MD5 (Message-Digest Algorithm 5).

Secondly, the terminal device may store the encrypted user personal information in the user personal information database.

Since the user personal information is encrypted, plaintext exposure may be avoided when there is a leakage of the user personal information, and the security of the user personal information is enhanced.

In some embodiments, after the terminal receives the user personal information inputted by the user, the terminal device may display a dialog box, inquiring whether the user would like to store the user personal information. In some embodiments, after the terminal device receives the user personal information inputted by the user, and after the user triggers a predetermined button, the terminal device may display a dialog box, inquiring whether the user would like to store the user personal information. Referring to FIG. 3B, after inputting the cell phone number on the personal information input page, the user clicks a save button 33, and the terminal device displays a storage confirming page 34 in a form of pop-up box. After the user clicks a "store" button 35, the terminal device stores the cell phone number in a user personal information database.

The user personal information database may be stored in various locations. For example, the user personal information database may be locally stored in the terminal device, stored in a server with a user service account number, or stored both locally in the terminal device and in the server with the user service account number, both of which are mutually synchronized. The user service account number used herein refers to an account number pre-registered by the user to obtain use authorization of the server, through which the user may login into the server to store, view, download information or perform other operations.

Referring to FIG. 3A, in step 303, the terminal device binds the user personal information database to a Subscriber Identity Module (SIM) card of a user identification module.

In some embodiments, the terminal device may store the binding relationship between the user personal information database and the SIM card. In some embodiments, when the user personal information database is stored in the server, the terminal device may send the binding relationship to the server, and the server may receive and store the binding relationship. In doing so, the server may validate a SIM card in the terminal device according to the binding relationship when the terminal device needs to acquire the user personal information from the server.

In step 304, the terminal device detects whether input of the user personal information is required to acquire the service in the automatic voice service system.

Step 304 may be performed by the terminal device when the user calls the service number of the automatic voice service system to obtain the service using the terminal device. The user personal information may be inputted before the service number is dialed, or may be inputted after the service number is dialed.

In some embodiments, the user personal information may be inputted before the service number is dialed, and step 304 may include the following operations.

Before the service number of the automatic voice service system is dialed, the terminal device may display at least one service corresponding to the service number. The terminal device may pre-store menu correspondence relationships between different service numbers and different service menus. In some embodiments, the service menu is a visual service menu which includes at least one menu item and each menu item corresponds to at least one service.

Figure 3C:
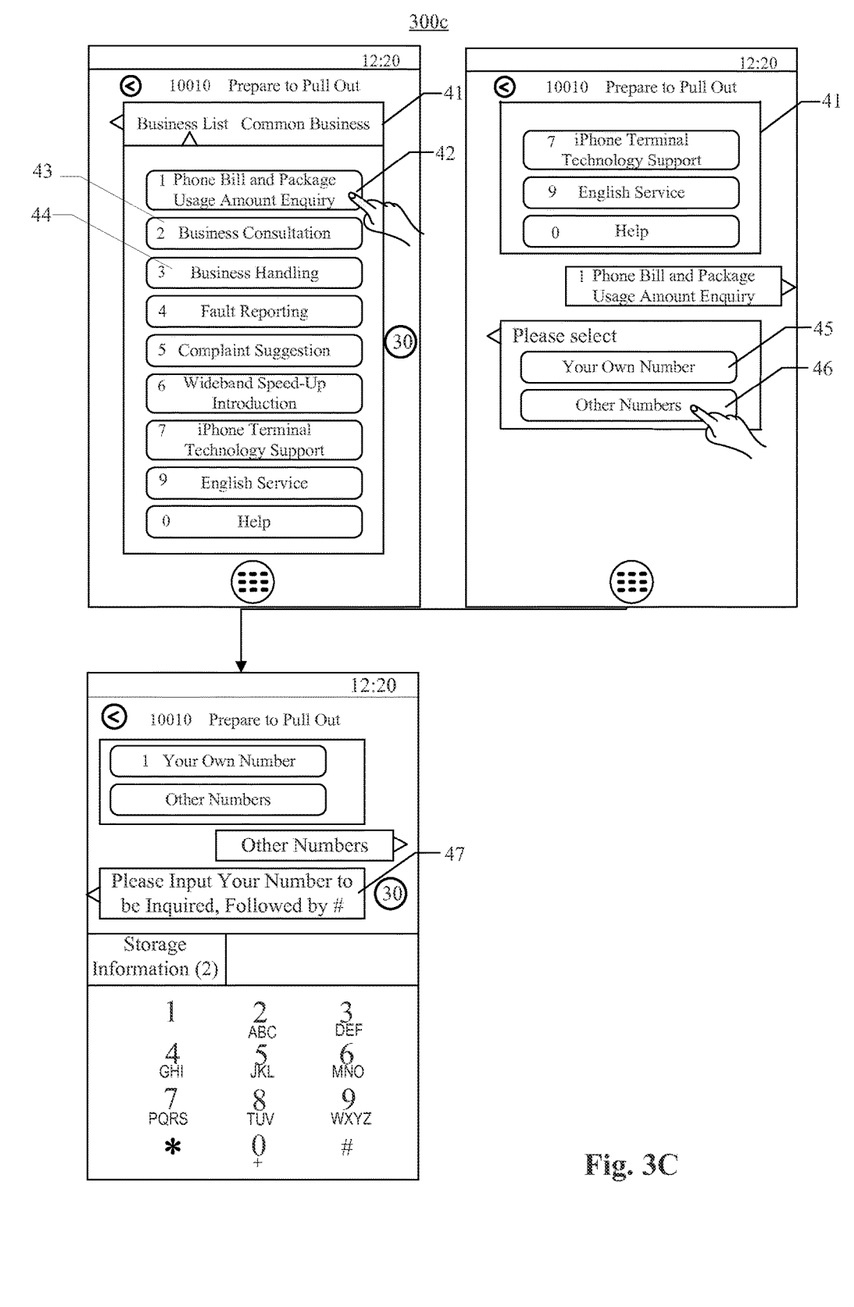
FIG. 3C is a schematic diagram of a service menu, according to an exemplary embodiment.

FIG. 3C shows a schematic diagram of a service menu 300c, provided by one embodiment of the present disclosure. In this example, the user personal information is inputted before the service number is dialed. Referring to FIG. 3C, the user calls service number 10010 of a telecommunication operator. Before the service number is dialed, the terminal device acquires a service menu 41 corresponding to the service number from the pre-stored menu correspondence relationships, and then displays the service menu 41. As can be seen from FIG. 3C, the service menu 41 includes several menu items such as a "phone bill and package usage amount enquiry" (menu item 42), a "business consultation" (menu item 43), a "business handling" (menu item 44), and each menu item corresponds to at least one service. For example, after the user clicks the "phone bill and package usage amount enquiry" (menu item 42), the terminal device displays an enquiry service of your own number (item 45) and an enquiry service of other numbers (item 46).

The terminal device may receive a selection signal corresponding to the at least one service. For example, the user selects menu item 46, i.e., the enquiry service of other numbers, and as a result, the terminal device receives the selection signal corresponding to the enquiry service of other numbers (menu item 46).

The terminal device may acquire the service menu corresponding to the selected service. The service menu corresponding to the selected service may be a portion of the service menu associated with the service number. Referring to FIG. 3C, contents of a service menu 47 corresponding to the menu item 46, i.e., enquiry service of the other numbers, may be shown, and the service menu 47 is configured to prompt the user to input a number to be enquired.

The terminal device detects whether the user personal information is required to be inputted according to the service menu. For example, when the service menu contains certain words such as "input", "number", the terminal device may determine that input of the user personal information is required to acquire the service.

In some embodiments, the user personal information may be inputted after the service number is dialed, and step 304 may include the following operations.

After the service number of the automatic voice service system is dialed, at least one service corresponding to the service number is displayed on the terminal device. A selection signal corresponding to the at least one service may be received. A service menu corresponding to the selected service may be acquired.

The terminal device may detect whether input of the user personal information is required to be according to the service menu. The terminal device may also detect whether input of the user personal information is required after the service number is dialed.

In some embodiments, if the terminal device detects whether input of the user personal information is required after the service number is dialed, the terminal device may identify, by using a voice identification technology, a voice prompt played by the automatic voice service system, and detect whether the user personal information is required according to an identification result of the voice prompt. For example, when the automatic voice service system plays the voice prompt "please input your number to be enquired, which is ended by #", the terminal device may identify the words such as "input", "number" by using the voice identification technology, and determine that input of the user personal information is required.

Referring to FIG. 3A, in step 305, if input of the user personal information is required to acquire service, the terminal device detects whether the SIM card in the terminal device is the SIM card bound to the user personal database.

In some embodiments, when the binding relationship between the user personal information database and the SIM card is stored in the terminal device, the terminal device detects whether the SIM card bound to the user personal information database is the same as the currently inserted SIM card in the terminal device. If they are the same, step 306 is performed. When the binding relationship between the user personal information database and the SIM card is stored in a server, the terminal device may send information of the currently inserted SIM card in the terminal device to the server. The server may detect whether the user personal information database bound to the SIM card is pre-stored according to the received information of the SIM card. If it is detected that the user personal information database bound to the SIM card is pre-stored, a validation passing instruction may be sent to the terminal device, where the validation passing instruction is used to instruct the terminal device to perform step 306.

By binding the user personal information database and the SIM card, and validating the SIM card in the terminal device, the user personal information database may be prevented from being read while the terminal device is used by other users. For example, if the user needs to give the terminal device to other users for use, the user only needs to pull out the SIM card, and the other users cannot acquire the user personal information database previously stored by the user in the terminal and/or server. On the other hand, if the user pre-stores the user personal information database and the binding relationship between the user personal information database and the SIM card in the server, when the user changes the terminal device but still uses the same SIM card, the user may acquire the pre-stored user personal information database from the server through the SIM card. The user may also download the user personal information database pre-stored in the server to the changed terminal device, such that loss and repetitive storage of information are avoided.

In step 306, if it is detected that the SIM card in the terminal is the SIM card bound to the user personal database, the terminal device acquires the user personal information required for the service from the pre-stored user personal information database.

When the user personal information database is locally stored, the terminal device may directly acquire the user personal information required for the service from the locally pre-stored user personal information database. When the user personal information database is not locally stored, the terminal may acquire the user personal information from the user personal information database pre-stored in the server using the user server account number.

In some embodiments, step 306 may include the following operations.

When the service menu corresponding to the selected service includes an information type of the user personal information required for the service, m pieces of the user personal information that match the information type are acquired from n pieces of the user personal information pre-stored in the user personal information database, and 1≤m≤n.

The information type may include a certificate number, a cell phone number, a bank card number, a game account number and/or the like. In storing the received user personal information to the user personal information database, the terminal device may classify and store the received user personal information according to the information type of the user personal information. Thus, when the user personal information needs to be acquired from the user personal information database, the user personal information may be filtered from the user personal information database according to the information type of the user personal information required for the service. In doing so, the user's follow-up selection may be made easier when a great deal of the user personal information is stored in the user personal information database.

Figure 3D:
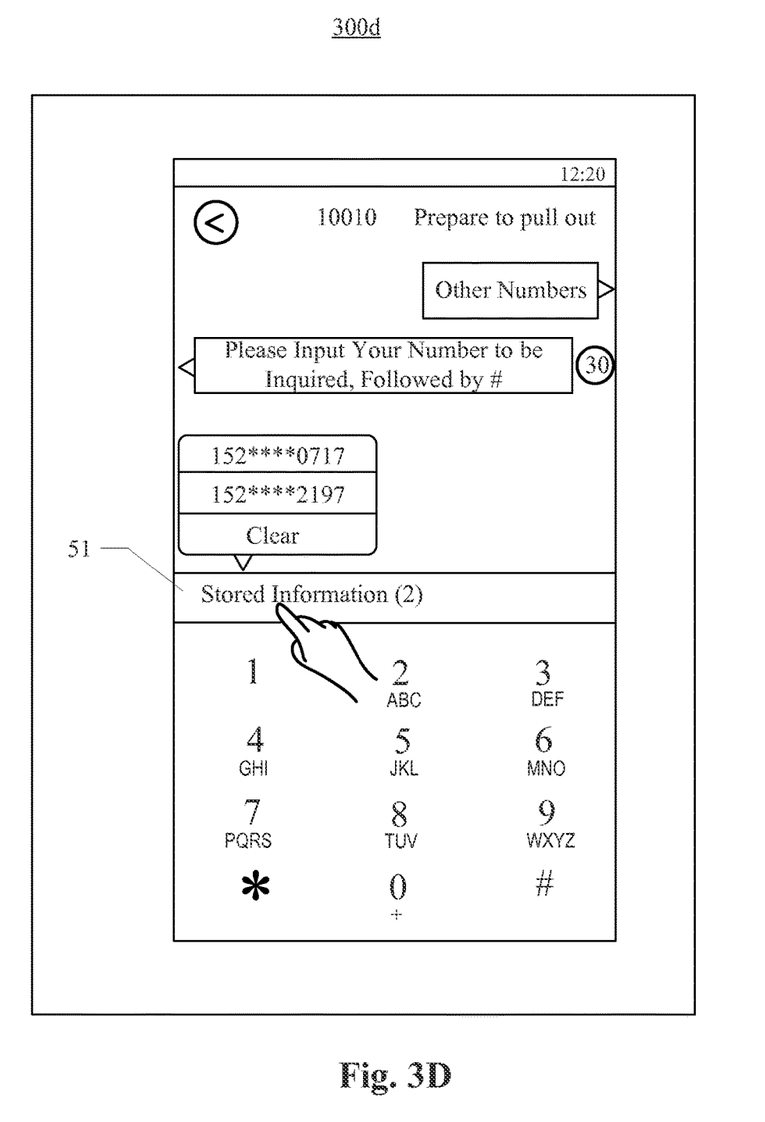
FIG. 3D is a schematic diagram of an interface for inputting user personal information, according to an exemplary embodiment.

Thereafter, the terminal device may display the m pieces of the user personal information. FIG. 3D shows a schematic diagram of an interface 300d for inputting the user personal information, provided by one embodiment of the present disclosure. Referring to FIG. 3D, after the user clicks a "stored information" button 51, the terminal device acquires the m pieces of the user personal information from the pre-stored user personal information database that match the information type (e.g., the cell phone number) of the user personal information required for the service. As shown in FIG. 3D, the information type of the user personal information required for the service is the cell phone number, and thus, the terminal device displays two cell phone numbers 152**0717 and 152**2197.

In some embodiments, in order to avoid the user personal information from being viewed and stolen by others, a portion of contents of the user personal information may be displayed in a hidden manner for some or all of the m pieces of the user personal information. As shown in FIG. 3D, the terminal device does not display the cell phone numbers completely, and four figures in the middle of the cell phone numbers are displayed in a hidden way. Thus, the security of the user personal information is enhanced while the user's selection is not interfered.

The user may select the user personal information required for the service from the m pieces of the user personal information displayed by the terminal, In doing so, the user saves time for manually inputting the personal information, and accuracy of the inputted information is also improved. Correspondingly, the terminal device receives the selection signals corresponding to one or more of the m pieces of the user personal information.

Subsequently, the terminal device uses the selected user personal information as the user personal information required for the service.

Referring to FIG. 3A, in step 307, the terminal device sends the user personal information required for the service to the automatic voice service system, where the automatic voice service system is configured to provide the service according to the user personal information.

Referring to FIG. 3D, the user selects a cell phone number 152****2197, and the terminal device sends this cell phone number to the automatic voice service system. Correspondingly, the automatic voice service system receives this cell phone number, acquires a phone bill and package usage condition corresponding to the cell phone number, and then sends the phone bill and package usage condition to the terminal device in a form of voice or text or the like.

In some embodiments, step 307 may include the following operations.

The terminal device may generate at least one DTMF (dual-tone multiple-frequency) signal corresponding to the user personal information required for the service. The DTMF signal is a composite signal that is composed by a high-frequency signal superposed with a low-frequency signal. For example, a high-frequency signal group may include 4 different high-frequency signals, a low-frequency signal group may include 4 different low-frequency signals, and 16 different composite signals may be obtained by respectively selecting one signal from each of the high-frequency signal group and the low-frequency signal group. Each composite signal may represent one button number. For example, button number "1" may be represented by a composite signal which is composed by a high-frequency signal of 1209 Hz superposed with a low-frequency signal of 697 Hz.

The terminal device may send the at least one DTMF signal to the automatic voice service system. Correspondingly, the automatic voice service system receives and interprets the DTMF signal sent by the terminal device, obtains the user personal information required for the service, and provides the service according to the user personal information.

In some embodiments, the method 300a may also include the following operations.

The terminal device may detect whether the current user is authorized to access the user personal information database. For example, the terminal device may detect the authorization of the user who is currently using the terminal device with a numeric password, a gesture password, a trajectory password and the like pre-set by the user. As another example, the terminal device may also detect the authorization of the user who is currently using the terminal with the feature information such as a fingerprint or an iris of the user.

The step of detecting the authorization may be performed before the operations of viewing, modifying and acquiring the user personal information in the user personal information database. For example, in step 306, before displaying the m pieces of the user personal information, the terminal device may detect the authorization of the current user. The terminal device may display the m pieces of the user personal information after the current user inputs correct password, or after the fingerprint of the current user is validated.

If it is detected that the current user is authorized to access the user personal information database, the terminal device may perform the corresponding operation according to the received information operating instruction. The information operating instruction may include an information viewing instruction, an information modifying instruction, an information acquiring instruction, and/or the like.

By acquiring the user personal information required for the service from the pre-stored user personal information database, the method 300 provides the benefits of saving the time taken for manually inputting the user personal information, avoiding the errors that might occur when the user personal information is manually inputted, increasing the efficiency for inputting the user personal information, and saving the time and resources consumed to acquire the automatic voice service.

In addition, by encrypting and storing the encrypted user personal information, the method 300 may prevent plaintext exposure when there is a leakage of the user personal information, and thereby, enhance the security of the user personal information. By binding the user personal information database and the SIM card, and validating the SIM card in the terminal device, the method 300 may prevent others from accessing the user personal information database while the terminal device is used by other users. Further, when the user changes the terminal device but still uses the same SIM card, the method 300 may allow the user to acquire the previously stored user personal information database from the server, such that loss and repetitive storage of information may be avoided. Moreover, by displaying a portion of contents of the acquired user personal information in a hidden manner, the method 300 may prevent the user personal information from being viewed and stolen by others while the user personal information is inputted, and thus, the security of the user personal information is enhanced.

Figure 4:
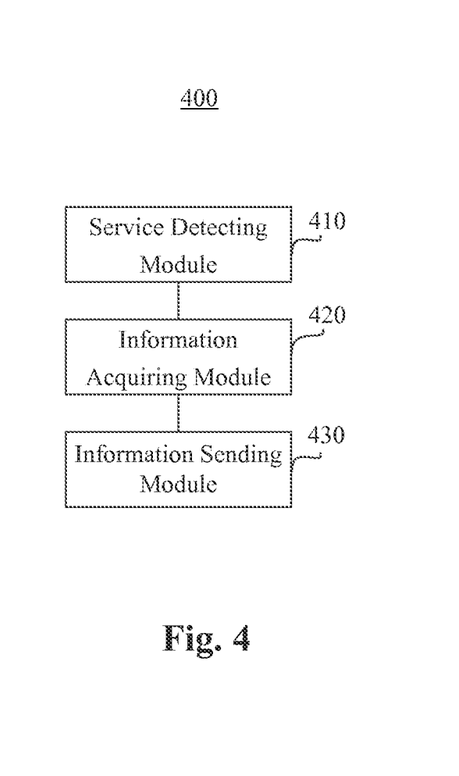
FIG. 4 is a block diagram of a device, according to an exemplary embodiment.

FIG. 4 is a block diagram showing a device 400, according to an exemplary embodiment. The device 400 may be implemented to be all or a part of a terminal device by software, hardware, or a combination thereof Referring to FIG. 4, the device 400 includes a service detecting module 410, an information acquiring module 420, and an information sending module 430.

The service detecting module 410 is configured to detect whether input of user personal information is required to acquire a service in an automatic voice service system to.

The information acquiring module 420 is configured to acquire the user personal information required for the service from a pre-stored user personal information database, if input of the user personal information is required for the service.

The information sending module 430 is configured to send the user personal information required for the service to the automatic voice service system, where the automatic voice service system is configured to provide the service according to the user personal information.

By acquiring the user personal information required for the service from the pre-stored user personal information database and sending the user personal information required for the service to the automatic voice service system, the time and resources consumed by inputting the user personal information is reduced. In this embodiment, the user personal information required for the service is acquired from the pre-stored user personal information database. In doing so, device 400 provides the benefit of saving the time taken for manually inputting the user personal information, avoiding the errors that might occur when the user personal information is manually input, increasing the efficiency for inputting the user personal information, and saving the time and resources consumed to acquire the automatic voice service.

Figure 5:
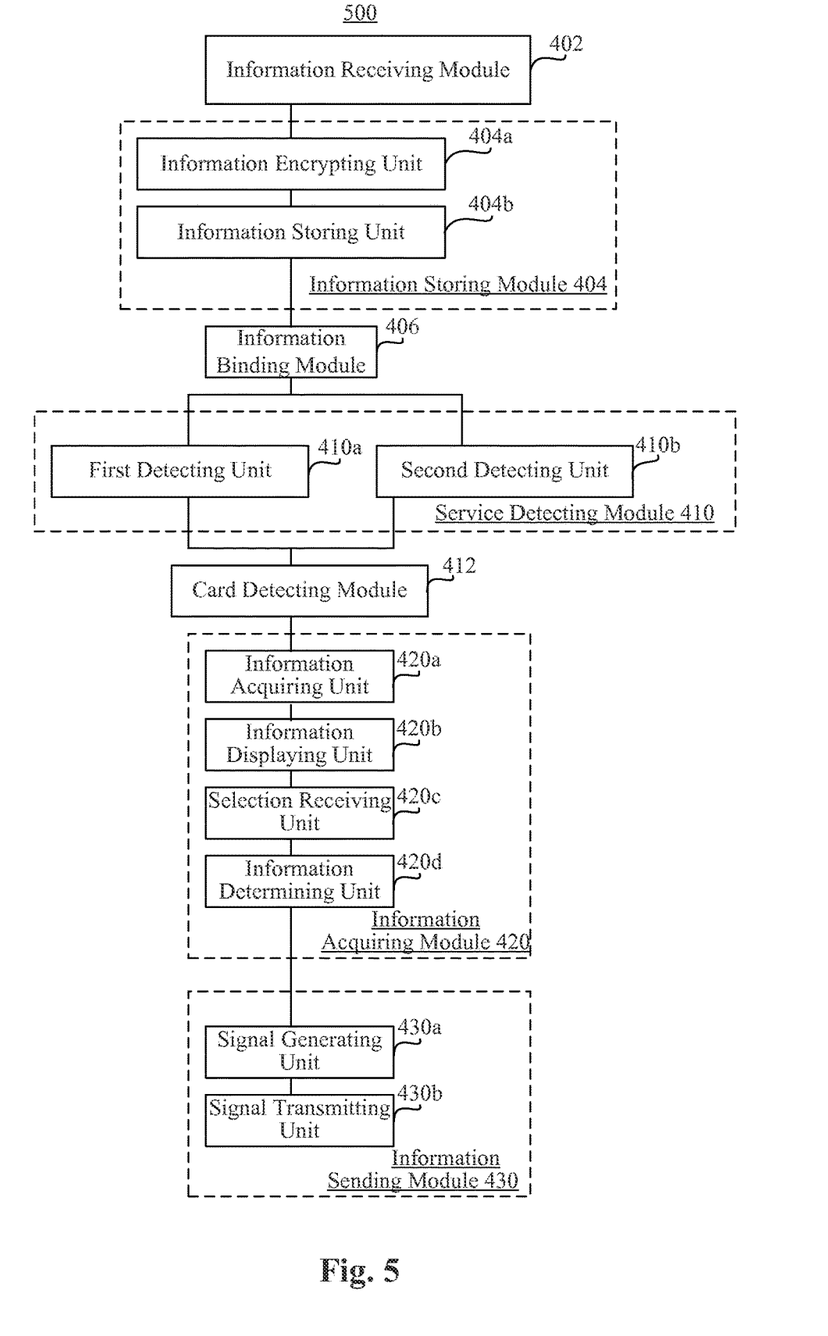
FIG. 5 is a block diagram of a device for, according to another exemplary embodiment.

FIG. 5 is a block diagram showing a device 500, according to another exemplary embodiment. The device 500 may be implemented to be all or a part of the terminal device by software, hardware or a combination thereof. Referring to FIG. 5, the device 500 may include an information receiving module 402, an information storing module 404, an information binding module 406, a service detecting module 410, a card detecting module 412, an information acquiring module 420, and an information sending module 430.

The service detecting module 410 is configured to detect whether input of user personal information is required to acquire a service in an automatic voice service system.

As shown in FIG. 5, the service detecting module 410 may include a first detecting unit 410a and/or a second detecting unit 410b.

The first detecting unit 410a is configured to, before a service number of the automatic voice service system is dialed, display at least one service corresponding to the service number, receive a selection signal corresponding to the at least one service, acquire a service menu corresponding to the selected service, and detect whether the user personal information is required to be inputted based on the service menu.

The second detecting unit 410b is configured to, after a service number of the automatic voice service system is dialed, display at least one service corresponding to the service number, receive a selection signal corresponding to the at least one service, acquire a service menu corresponding to the selected service, and detect whether the user personal information is required to be inputted according to the service menu.

The information acquiring module 420 is configured to acquire the user personal information required for the service from a pre-stored user personal information database, if input of the user personal information is required to acquire the service.

As shown in FIG. 5, the information acquiring module 420 may include an information acquiring unit 420a, an information displaying unit 420b, a selection receiving unit 420c, and an information determining unit 420d.

The information acquiring unit 420a is configured to, when the service menu includes an information type of the user personal information required for the service, acquire m pieces of the user personal information that match the information type from the pre-stored user personal information database, where the user personal information database includes n pieces of the user personal information, $1 \leq m \leq n$, and m and n are positive integers.

The information displaying unit 420b is configured to display the m pieces of the user personal information.

In some embodiments, the information displaying unit 420b is further configured to display a portion of contents of the user personal information in a hidden manner for some or all of the m pieces of the user personal information.

The selecting receiving unit 420c is configured to receive selection signals corresponding to the m pieces of the user personal information.

The information determining unit 420d is configured to use the selected user personal information as the user personal information required for the service.

The information sending module 430 is configured to send the user personal information required for the service to the automatic voice service system, where the automatic voice service system is configured to provide the service according to the user personal information.

As shown in FIG. 5, the information sending module 430 may include a signal generating unit 430a and a signal transmitting unit 430b.

The signal generating unit 430a is configured to generate at least one dual-tone multiple-frequency (DTMF) signal corresponding to the user personal information required for the service.

The signal transmitting unit 430b is configured to transmit the at least one DTMF signal to the automatic voice service system.

In some embodiments, the device 500 may further include an information receiving module 402 and an information storing module 404.

The information receiving module 402 is configured to receive at least one piece of the user personal information before initiation of the voice service.

The information storing module 404 is configured to store the at least one piece of the user personal information to the user personal information database.

The user personal information database may be locally stored, may be stored in a server with a user service account number, or may be both locally stored and also stored in the server with the user service account number, both of which are mutually synchronized.

In some embodiments, the information storing module 404 may include an information encrypting unit 404a and an information storing unit 404b.

The information encrypting unit 404a is configured to encrypt one or more pieces of the received user personal information.

The information storing unit 404b is configured to store the encrypted user personal information to the user personal information database.

In some embodiments, the device 500 may further include an information binding module 406.

The information binding module 406 is configured to bind the user personal information database to a SIM card of a user identification module.

In some embodiments, the device 500 may further include a card detecting module 412.

The card detecting module 412 is configured to detect whether a SIM card in a terminal device is the SIM card bound to the user personal database.

If it is detected that the SIM card in the terminal device is the SIM card bound to the user personal database, the information acquiring module 420 may be further configured to acquire the user personal information required for the service from the pre-stored user personal information database.

In some embodiments, the device 500 may further include an authority detecting module (not shown) and an operation performing module (not shown).

The authority detecting module is configured to detect whether a current user is authorized to access the user personal information database.

If it is detected that the current user is authorized to access the user personal information database, the operation performing module is configured to perform a corresponding operation according to a received information operating instruction. The information operating instruction may include, for example, an information viewing instruction, an information modifying instruction and/or an information acquiring instruction.

By acquiring the user personal information required for the service from the pre-stored user personal information database, the device 500 provides the benefits of saving the time taken for manually inputting the user personal information, avoiding the errors that might occur when the user personal information is manually inputted, increasing the efficiency for inputting the user personal information, and saving the time and resources consumed to acquire the automatic voice service.

In addition, by encrypting and storing the encrypted user personal information, the device 500 may avoid plaintext exposure of the user personal information, and thus, the security of the user personal information is enhanced. By binding the user personal information database and the SIM card and validating the SIM card in the terminal device, the device 500 may prevent others from accessing the user personal information database pre-stored in the terminal device and/or the server while the terminal device is used by other users. Further, when the user changes the terminal device but still uses the same SIM card, the device 500 may enable the user to acquire the previously stored user personal information database from the server, such that loss and repetitive storage of information may be avoided. Moreover, by displaying a portion of contents of the acquired user personal information in a hidden manner, the device 500 may prevent the user personal information from being viewed and stolen by others while the user personal information is inputted, and thus, the security of the user personal information is enhanced.

With respect to the devices in the above embodiments, the specific manners for performing operations for individual modules therein have been described in detail in the embodiments regarding the method for sending information in the voice service, which will not be elaborated herein.

Figure 6:
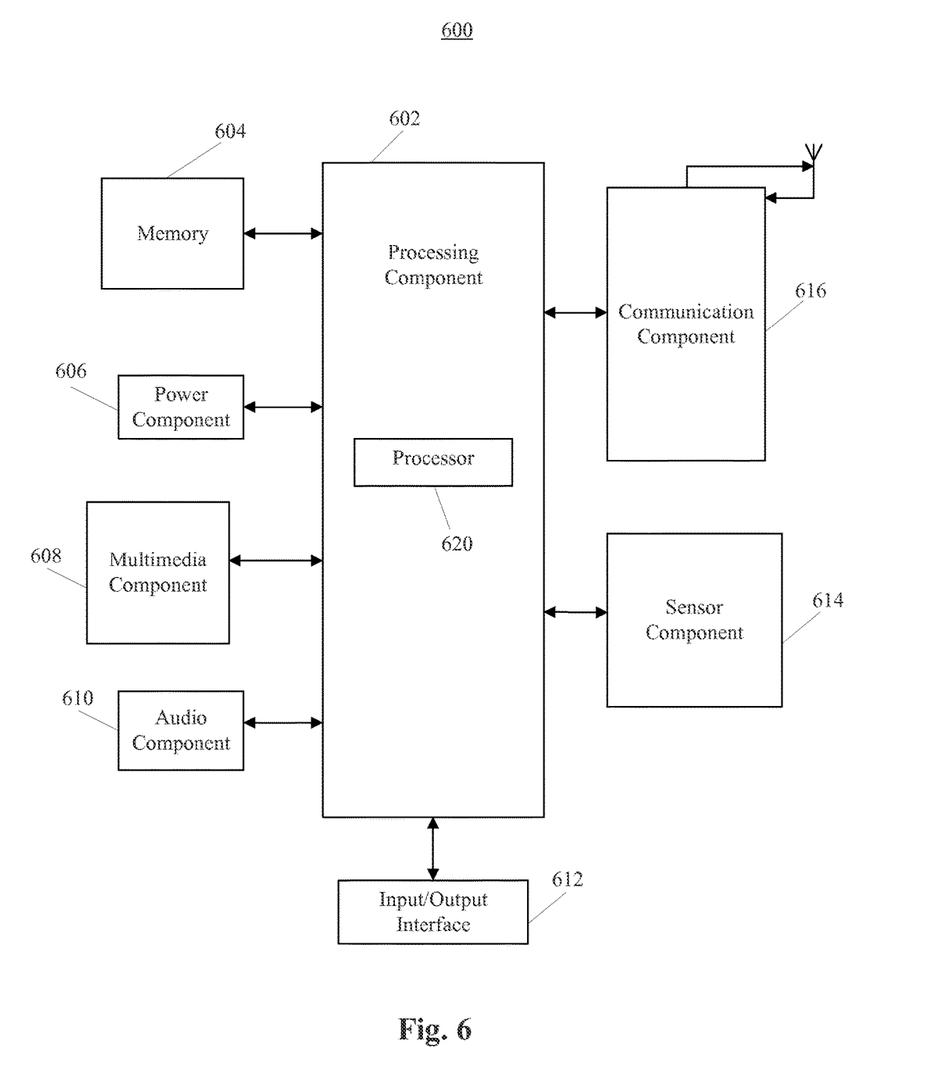
FIG. 6 is a block diagram of a terminal device, according to an exemplary embodiment.

FIG. 6 is a block diagram of a terminal device 600 for providing information in a voice service system, according to an exemplary embodiment. For example, the terminal device 600 may be a mobile phone, a computer, a digital broadcast terminal, a messaging device, a gaming console, a tablet, a medical device, exercise equipment, a personal digital assistant, and/or the like.

Referring to FIG. 6, the terminal device 600 may include one or more of the following components: a processing component 602, a memory 604, a power component 606, a multimedia component 608, an audio component 610, an input/output (I/O) interface 612, a sensor component 614, and a communication component 616. The person skilled in the art should appreciate that the structure of the terminal device 600 as shown in FIG. 6 does not intend to limit the terminal device 600. The terminal device 600 may include more or less components or combine some components or other different components.

The processing component 602 usually controls overall operations of the terminal device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the terminal device 600. Examples of such data include instructions for any application or method operated on the terminal device 600, contact data, phonebook data, messages, pictures, videos, etc. The memory 604 is also configured to store programs and modules. The processing component 602 performs various functions and data processing by operating programs and modules stored in the memory 604. The memory 604 may be implemented using any type of volatile or non-volatile memory device or combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 is configured to provide power to various components of the terminal device 600. The power component 606 may include a power management system, one or more power sources, and/or other components associated with the generation, management, and distribution of power in the terminal device 600.

The multimedia component 608 includes a screen providing an output interface between the terminal device 600 and the user. In some embodiments, the screen may include a liquid crystal display (LCD) and/or a touch panel (TP). If the screen includes the touch panel, the screen may be implemented as a touch screen to receive input signals from the user. The touch panel includes one or more touch sensors to sense touches, slips, and gestures performed on the touch panel. The touch sensors may not only sense a boundary of a touch or slip action, but also sense a period of time and a pressure associated with the touch or slip action. In some embodiments, the multimedia component 608 includes a front camera and/or a rear camera. The front camera and/or the rear camera may receive an external multimedia datum while the terminal device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 may include a microphone ("MIC") configured to receive an external audio signal when the terminal device 600 is in an operation mode, such as a call mode, a recording mode, and/or a voice identification mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, a button, and the like. The button may include, but not limited to, a home button, a volume button, a starting button, and/or a locking button.

The sensor component 614 includes one or more sensors to provide status assessments of various aspects of the terminal device 600. For instance, the sensor component 614 may detect an on/off status of the terminal device 600, relative positioning of components, e.g., the display and the keyboard, of the terminal device 600, a change in position of the terminal device 600 or a component of the terminal device 600, a presence or absence of user contact with the terminal device 600, an orientation or an acceleration/deceleration of the terminal device 600, and/or a change in temperature of the terminal device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the terminal device 600 and other devices. The terminal device 600 can access a wireless network based on a communication standard, such as WiFi, 2G, or 3G, or a combination thereof. In one exemplary embodiment, the communication component 616 receives a broadcast signal or information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and/or other technologies.

In exemplary embodiments, the terminal device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 604, executable by the processor 620 in the terminal device 600, for performing the above-described methods. For example, the non-transitory computer-readable storage medium may be a ROM, a random access memory (RAM), a CD-ROM, a magnetic tape, a floppy disc, an optical data storage device, and the like.

It should be understood by those skilled in the art that the above described methods, devices, and modules can each be implemented through hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. The present disclosure is meant to cover any variations, usage or adaptive change of these embodiments, and these variations, usage or adaptive change follow general concept of the present disclosure and include the common knowledge or the customary technical means in the technical field that is not disclosed in the present disclosure. It is intended that the specification and examples be considered as exemplary only, with a true scope and spirit of the invention being indicated by the following claims.

It should be understood that the present disclosure is not limited to the exact structures that are described above and shown in the accompanying drawings, and may be modified and changed without departing from the scope of the present disclosure. It is intended that the scope of the invention only be limited by the appended claims.

What is claimed is:

1. A method for providing information for a voice service, comprising:
   detecting, by a terminal device, that user personal information is required to acquire a service in an automatic voice service system based on whether a service menu corresponding to the service includes one or more predetermined words, wherein the service menu indicates an information type of the required user personal information, and wherein the detecting comprises:
      displaying at least one service corresponding to a service number of the automatic voice service system before or after the service number is dialed;
      receiving a selection signal selecting the at least one service;
      acquiring the service menu corresponding to the selected service; and
      detecting whether the user personal information is required to be inputted based on the service menu, the service menu being a visual service menu associated with the service number and including at least one menu item, and each menu item corresponding to at least one service;
   acquiring, by the terminal device, the user personal information that matches the information type from a pre-stored user personal information database; and
   sending the acquired user personal information for the automatic voice service system to provide the service according to the user personal information.

2. The method according to claim 1, wherein the acquiring of the user personal information comprises:
   when the service menu includes an information type of the user personal information, acquiring one or more pieces of the user personal information that match the information type from the pre-stored user personal information database;
   displaying the one or more pieces of the user personal information;
   receiving a selection signal selecting one of the one or more pieces of the user personal information; and
   using the selected one of the one or more pieces of the user personal information as the acquired user personal information.

3. The method according to claim 2, wherein a portion of the one or more pieces of the user personal information is displayed in a hidden manner.

4. The method according to claim 1, further comprising:
   receiving at least one piece of the user personal information before the detecting; and
   storing the at least one piece of the user personal information in the user personal information database.

5. The method according to claim 4, wherein the storing comprises:
   encrypting the at least one piece of the user personal information; and
   storing the encrypted user personal information in the user personal information database.

6. The method according to claim 1, further comprising:
   binding the user personal information database to a Subscriber Identity Module (SIM) card of a user identification module.

7. The method according to claim 6, further comprising:
   detecting whether a SIM card in the terminal device is the SIM card bound to the user personal information database; and
   if it is detected that the SIM card in the terminal device is the SIM card bound to the user personal information database, acquiring the user personal information from the user personal information database.

8. The method according to claim 1, further comprising:
   detecting whether a user is authorized to access the user personal information database; and
   if it is detected that the user is authorized to access the user personal information database, performing a corresponding operation according to a received operating instruction provided by the user.

9. The method according to claim 1, wherein the sending includes:
   generating at least one dual-tone multiple-frequency (DTMF) signal based on the user personal information; and
   transmitting the at least one DTMF signal to the automatic voice service system.

10. A device for providing information for a voice service, comprising:
    a processor; and
    a memory for storing instructions executable by the processor;
    wherein the processor is configured to:
    detect that user personal information is required to acquire a service in an automatic voice service system based on whether a service menu corresponding to the service includes one or more predetermined words, wherein the service menu indicates an information type of the required user personal information, and wherein the detecting comprises:
       displaying at least one service corresponding to a service number of the automatic voice service system before or after the service number is dialed;
       receiving a selection signal selecting the at least one service;
       acquiring the service menu corresponding to the selected service; and
       detecting whether the user personal information is required to be inputted based on the service menu, the service menu being a visual service menu associated with the service number and including at least one menu item, and each menu item corresponding to at least one service;

acquire the user personal information that matches the information type from a pre-stored user personal information database; and send the acquired user personal information for the automatic voice service system to provide the service according to the user personal information.

11. The device according to claim 10, wherein the processor is further configured to:

when the service menu includes an information type of the user personal information, acquire one or more pieces of the user personal information that match the information type from the pre-stored user personal information database;

display the one or more pieces of the user personal information;

receive a selection signal selecting one of the one or more pieces of the user personal information; and use the selected one of the one or more pieces of the user personal information as the acquired user personal information.

12. The device according to claim 11, wherein the processor is further configured to display a portion of the one or more pieces of the user personal information in a hidden manner.

13. The device according to claim 10, wherein the processor is further configured to:

receive at least one piece of the user personal information; and store the at least one piece of the user personal information in the user personal information database.

14. The device according to claim 13, wherein the processor is further configured to:

encrypt the at least one piece of the user personal information; and store the encrypted user personal information in the user personal information database.

15. The device according to claim 10, wherein the processor is further configured to:

bind the user personal information database to a Subscriber Identity Module (SIM) card of a user identification module.

16. The device according to claim 15, wherein the processor is further configured to:

detect whether a SIM card in the device is the SIM card bound to the user personal information database; and if it is detected that the SIM card in the device is the SIM card bound to the user personal information database, acquire the user personal information from the user personal information database.

17. The device according to claim 10, wherein the processor is further configured to:

detect whether a user is authorized to access the user personal information database; and if it is detected that the is authorized to access the user personal information database, perform a corresponding operation according to a received operating instruction provided by the user.

18. The device according to claim 10, wherein the processor is further configured to:

generate at least one dual-tone multiple-frequency (DTMF) signal based on the user personal information; and transmit the at least one DTMF signal to the automatic voice service system.

19. A non-transitory computer-readable medium having stored therein instructions that, when executed by a processor of a terminal device, cause the terminal device to perform operations including:

detecting, by the terminal device, that user personal information is required to acquire a service in an automatic voice service system based on whether a service menu corresponding to the service includes one or more predetermined words, wherein the service menu indicates an information type of the required user personal information, and wherein the detecting comprises:

displaying at least one service corresponding to a service number of the automatic voice service system before or after the service number is dialed;

receiving a selection signal selecting the at least one service;

acquiring the service menu corresponding to the selected service; and detecting whether the user personal information is required to be inputted based on the service menu, the service menu being a visual service menu associated with the service number and including at least one menu item, and each menu item corresponding to at least one service;

acquiring, by the terminal device, the user personal information that matches the information type from a pre-stored user personal information database; and sending the acquired user personal information for the automatic voice service system to provide the service according to the user personal information.

* * * * *